(12) United States Patent
Cherp et al.

(10) Patent No.: US 11,269,787 B1
(45) Date of Patent: Mar. 8, 2022

(54) END-TO-END SECURE LIFECYCLE OF SECRETS WITH MINIMAL FOOTPRINT

(71) Applicant: CyberArk Software Ltd., Petach-Tikva (IL)

(72) Inventors: Mark Cherp, Petach-Tivka (IL); Nir Chako, Petach-Tikva (IL); Asaf Hecht, Petach-Tikva (IL)

(73) Assignee: CYBERARK SOFTWARE LTD, Petach-Tikva (IL)

(*) Notice: Subject to any disclaimer, the term of this patent is extended or adjusted under 35 U.S.C. 154(b) by 0 days.

(21) Appl. No.: 17/376,025

(22) Filed: Jul. 14, 2021

(51) Int. Cl.
*G06F 12/00* (2006.01)
*G06F 13/00* (2006.01)
*G06F 13/28* (2006.01)
*G06F 12/14* (2006.01)
G06F 21/62 (2013.01)
G06F 21/60 (2013.01)

(52) U.S. Cl.
CPC ...... *G06F 12/1425* (2013.01); *G06F 12/1408* (2013.01); *G06F 12/14* (2013.01); *G06F 21/60* (2013.01); *G06F 21/62* (2013.01); *G06F 2212/1052* (2013.01)

(58) Field of Classification Search
CPC .. G06F 12/14; G06F 12/1408; G06F 12/1425; G06F 21/60; G06F 21/62; G06F 2212/1052
USPC ....................................................... 711/163
See application file for complete search history.

(56) References Cited

U.S. PATENT DOCUMENTS

| | | | |
|---|---|---|---|
| 2002/0042884 A1* | 4/2002 | Wu | H04L 63/062 726/10 |
| 2005/0083956 A1* | 4/2005 | Carnevale | H04L 49/9047 370/412 |
| 2015/0212884 A1* | 7/2015 | Nakanishi | G06F 11/1008 714/767 |
| 2018/0004680 A1* | 1/2018 | Elzur | G06F 12/145 |
| 2018/0052659 A1* | 2/2018 | Thomas | G06F 5/065 |
| 2020/0213246 A1* | 7/2020 | Pan | G06F 15/17331 |
| 2020/0379791 A1* | 12/2020 | Tsirkin | G06F 3/0646 |

* cited by examiner

*Primary Examiner* — Edward J Dudek, Jr.
*Assistant Examiner* — Sidney Li
(74) *Attorney, Agent, or Firm* — Finnegan, Henderson, Farabow, Garrett & Dunner, LLP

(57) ABSTRACT

Disclosed embodiments relate to systems and methods for providing an end-to-end secure lifecycle of data. Techniques include receiving a request from a client to access data; reserving a designated memory region; protecting the designated memory region using access restriction to certain processes of an operating system; receiving data from a trusted source; injecting the data into the designated memory region in a zero-copy manner; sending the data to the client in a zero-copy manner; receiving an indication that the client performed an interaction; and in response to the indication, disposing of the data and the designated memory region.

20 Claims, 2 Drawing Sheets

END-TO-END SECURE LIFECYCLE OF SECRETS WITH MINIMAL FOOTPRINT

BACKGROUND

Organizations and individuals increasingly use remote network connections for accessing secure files and other network resources.

For example, many organizations allow individuals to work collaboratively from different offices, from home office locations, or while travelling. As another example, individuals may use cloud-based servers for storing electronic files and may access these files through a remote connection. These remote connections provide improved flexibility, allowing users to access a network remotely as if their device was connected to the network directly. Although advantageous in terms of flexibility and efficiency, these remote connections may present security vulnerabilities and are common targets for malicious actors to gain access to the secure network, stored secrets, or sensitive data.

Some existing techniques, such as virtual private networks (VPNs), require the installation of VPN clients, which can be cumbersome for users and often lead to increased operating expenditures for organizations. Further, VPNs often do not discriminate among target resources, and instead provide users with full access to the network. For this reason, VPN clients are common attack points for malicious users, who may target security vulnerabilities to gain access to secure networks and harvest user credentials or other sensitive data. Further, such VPN clients often require users to enter passwords specific to the VPN service, which increases the risk of credentials theft and deteriorates the user's experience. Other techniques, such as HTML5 gateway solutions, do not require the installation of VPN clients, but equally provide a poor user experience by requiring a browser-based session, rather than a native desktop client.

Some remote desktop gateway techniques allow for passwordless or multi-factor authentication, however, additional passwords may be required to access a particular target resource. Further, these remote desktop gateways often require a user to identify details of a target server (such as IP addresses, or port configurations), a domain username, or other sensitive information, which may create an attack vector for malicious actors. Present systems do not allow for a fully secured lifecycle of a secret, credential, or other sensitive piece of information in-memory. There is no methodology to keep the secret safe during its entire life cycle.

Several methods exist for securing secrets in-memory, but none of the methods are in the context of a full lifecycle from consumption by an NIC (Network Interface Card) to disposal (e.g., deletion, rotation, deactivation, etc.). The request lies in the end-to-end secure secret lifecycle and the methods are employed laterally on the entire pipeline and specifically on a specific node in the pipeline.

Accordingly, in view of these and other deficiencies in existing techniques, technological solutions are needed for securely establishing a fully secured lifecycle of secure files, data, or secrets. In particular, technological solutions should advantageously allow for a unified solution for securing in-memory secrets from the instant the data is received in the network device to the moment it is disposed of. Further, technological solutions should allow for methods to secure and isolate a secret throughout its entire lifecycle in a privilege-aware pipeline that allows for managing secrets with the least required level of privilege.

SUMMARY

The disclosed embodiments describe non-transitory computer readable media, systems, and methods for providing an end-to-end secure lifecycle of data. For example, in an embodiment, a non-transitory computer readable medium may include instructions that, when executed by at least one processor, cause the at least one processor to perform operations for providing an end-to-end secure lifecycle of data. The operations may comprise receiving a request from a client to access data; reserving a designated memory region; protecting the designated memory region using access restriction to certain processes of an operating system; receiving data from a trusted source; injecting the data into the designated memory region in a zero-copy manner; sending the data to the client in a zero-copy manner; receiving an indication that the client performed an interaction; and in response to the indication, disposing of the data and the designated memory region.

According to a disclosed embodiment, protecting the designated memory region further uses at least one of: hardware encryption; file permissions restrictions; data randomization; label based descriptive limitations; or behavior based descriptive limitations.

According to a disclosed embodiment, the data is a secret.

According to a disclosed embodiment, the secret includes at least one of: a credential, login information, or access-restricted data.

According to a disclosed embodiment, the request is a login request.

According to a disclosed embodiment, access restriction to certain processes of an operating system is performed using a mapping function.

According to a disclosed embodiment, the designated memory region includes a virtualized instance.

According to a disclosed embodiment, the virtualized instance is an OS level container.

According to a disclosed embodiment, protecting the designated memory region includes wrapping it in its entirety with a reduced attack surface hypervisor.

According to a disclosed embodiment, the operations may further comprise creating, within a protected memory region, a virtualized container and running a hardware-assisted virtualization hypervisor on the virtualized container.

According to a disclosed embodiment, the operations may further comprise executing, on top of the hardware-assisted virtualization hypervisor, a single address space machine image with an attack surface limited according to minimal required functionality.

According to another disclosed embodiment, there may be a network system for providing an end-to-end secure lifecycle of data. The network system may comprise at least one computer-readable memory storing instructions; and at least one processor configured to execute the instructions to: receive a request from a client to access data; reserve a designated memory region; protect the designated memory region using access restriction to certain processes of an operating system; receive data from a trusted source; inject the data into the designated memory region in a zero-copy manner; send the data to the client in a zero-copy manner; receive an indication that the client performed an interaction; and in response to the indication, dispose of the data and the designated memory region.

According to a disclosed embodiment, wherein protecting the designated memory region further uses at least one of: hardware encryption; file permissions restrictions; data randomization; label based descriptive limitations; or behavior based descriptive limitations.

According to a disclosed embodiment, the data is a secret.

According to a disclosed embodiment, the secret includes at least one of: a credential, login information, or access-restricted data.

According to a disclosed embodiment, the request is a login request.

According to a disclosed embodiment, access restriction to certain processes of an operating system is performed using a mapping function.

According to a disclosed embodiment, the designated memory region includes a virtualized instance.

According to a disclosed embodiment, the virtualized instance is an OS level container.

According to a disclosed embodiment, protecting the designated memory region includes wrapping it in its entirety with a reduced attack surface hypervisor.

The disclosed embodiments also describe a computer-implemented method for providing an end-to-end secure lifecycle of data. The computer-implemented method may comprise receiving a request from a client to access data; reserving a designated memory region; protecting the designated memory region using access restriction to certain processes of an operating system; receiving data from a trusted source; injecting the data into the designated memory region in a zero-copy manner; sending the data to the client in a zero-copy manner; receiving an indication that the client performed an interaction; and in response to the indication, disposing of the data and the designated memory.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for providing an end-to-end secure lifecycle of data described herein overcome several technological problems relating to security, efficiency, and functionality in the fields of cybersecurity and remote network access. In particular, the disclosed embodiments provide techniques for securely establishing a fully secured lifecycle of files, data, or secrets (e.g., passwords, tokens, keys, hashes, etc.). As discussed above, several current systems have been attempted for securing secrets in-memory, but none are adequate or secure in the context of full a lifecycle of sensitive data, from consumption by NIC (Network Interface Card) to disposal (e.g., deletion, rotation, deactivation, etc.). The techniques disclosed below address these technological problems in the end-to-end security of a secret's lifecycle, and the techniques may be employed laterally (e.g., on an entire pipeline) and specifically (e.g., on a specific node in the pipeline).

Figure 1:
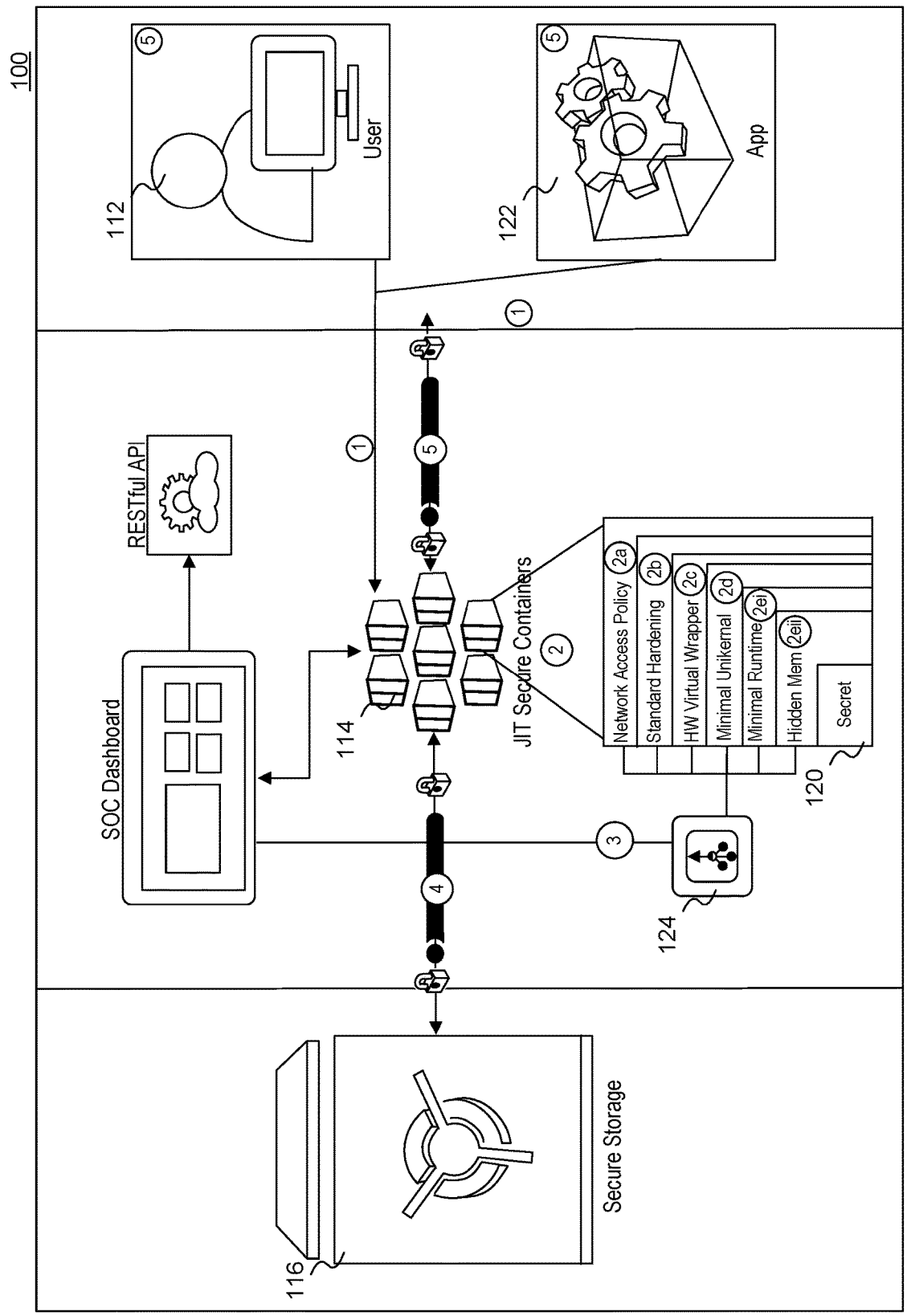
FIG. 1 is a block diagram showing example network and computer systems for providing an end-to-end secure lifecycle of data, consistent with the disclosed embodiments.
Figure 2:
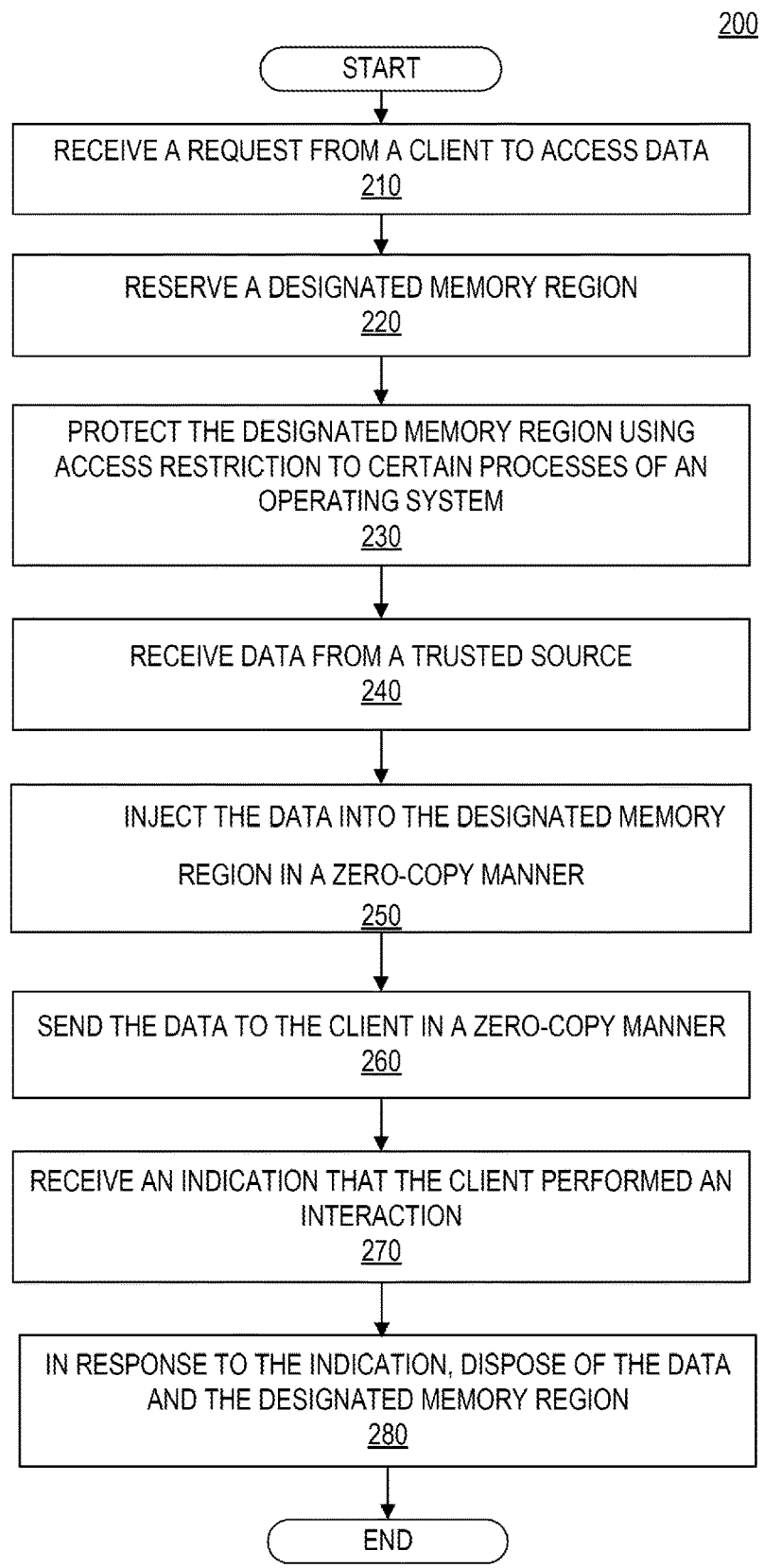
FIG. 2 is a flowchart depicting an example process for providing an end-to-end secure lifecycle of data, consistent with the disclosed embodiments.

The disclosed embodiments, as discussed below in connection with FIGS. 1 and 2 provide technical solutions to these and other problems with current techniques. In particular, the disclosed techniques allow for a unified solution for securing in-memory secrets from the instant the data is received in the network device to the moment it is discarded. Further, technological solutions should allow for methods to secure and isolate a secret throughout its entire lifecycle in a privilege-aware pipeline which allows for managing secrets with the least required level of privilege (e.g., according to a least-privilege policy).

Reference will now be made in detail to the disclosed embodiments, examples of which are illustrated in the accompanying drawings.

Aspects of the disclosed techniques may include receiving a request from a client to access data. In some embodiments, the system may receive a request from an application to access data. Data may include a secret, secure files, program data, document data, credentials, or any other sensitive piece of information. Aspects of the disclosed techniques may include that the secret may include a credential, login information, or access-restricted data. In some embodiments, after receiving a request from a client to access data, the system may move data from one location to another location in a secure manner. Aspects of this disclosure may include that the request is a login request, an access request, a download request, an upload request, etc.

In some embodiments, the client may be a software client (e.g., application, applet, virtualized instance, browser, etc.) or may be a computer, server, web server, container, identity, application, or other destination. The system may operate as part of a mechanism that runs on a component between a vault and an endpoint of the user. Alternatively, the system may run locally on the endpoint where the user receives the data, e.g., a secret, and the data moves on to be disposed of.

As discussed further below, in some embodiments, the secret provider may take secrets from one place and pass secrets to another place through mapping and zero-copy techniques. This is a secure way to manage the input of data, processing of data by a user or application, and output of data (secure disposal). In some embodiments, from the very beginning, there may be no copies of a secret, and there may be merely one physical place where the secret resides. Accordingly, when cleaning the memory, there may be only a need to clean one location.

Aspects of the disclosed techniques may include reserving a designated memory region. In some embodiments, because the system is reserving a designated memory region, the system may not need to utilize the native memory of the device itself.

Aspects of the disclosed techniques may include that the designated memory region includes a virtualized instance. Furthermore, aspects of the disclosed techniques may include that the virtualized instance is an operating system (OS)-level container. Aspects of the disclosed techniques may include protecting the designated memory region using access restriction to certain processes of an operating system. In one example, a packet received at a network card may be immediately received at the RAM memory and may be mapped to the virtual memory of the process (memory mapped IO function). Once mapped to the virtual memory and the data is inside the protected memory, there may be no copy of the data (the only instance of the secret). In some embodiments, the memory region is not concealed from the operating system and is only mapped for some and unreachable for others.

Aspects of the disclosed techniques may include that protecting the designated memory region further uses at least one of: hardware encryption, file permissions restrictions, data randomization, label based descriptive limitations, or behavior based descriptive limitations. Additionally, aspects of the disclosed techniques may include that the access restriction to certain processes of an operating system is performed using a mapping function. Further, aspects of the disclosed techniques may include that protecting the designated memory region includes wrapping it in its entirety with a reduced attack surface hypervisor.

In some embodiments, a feature of the memory region is that it is hiding and mapping the memory so as to not use native RAM on the computing device. The system may make sure that once a secret is fetched from the secure storage and until the end of its usage, there will be no copies of the secret (referred to herein as zero-copy). Specifically, from the very first point the packet arrives in the network card to the last moment it is disposed of it, the secret is created and located in one location. Once received in a NIC, the system does not copy the data, as discussed below in disclosed embodiments. Instead, the system uses memory mapping to take the memory portion where the data is and map it to the boundaries of the secure container (e.g., merely remapping it, not copying it).

Additionally, the entire secret may be held within a single packet in some embodiments. So, when a packet arrives to a computer (e.g., through a NIC and the network controller is a physical device that has a driver which maps the memory of the network device to the physical memory of the computer (RAM)), if the system wants to map the secret from the network region to the protected region, there is no need to move the secret. The system may, as discussed further below, merely need to change the pointer. From the moment the system changes the pointer, the secret may only live in the virtual memory of the region and is no longer accessible in the network card.

Aspects of the disclosed techniques may include receiving data from a trusted source. In some embodiments, the system may receive data, such as a secret, from a trusted source such as a client. Aspects of the disclosed techniques may also include injecting the data into the designated memory region in a zero-copy manner. For example, injecting data may include an event where the system receives the secret inside a network card, and it is mapped to the physical memory. Accordingly, in some embodiments, the system may change this mapping to be mapped inside of the protected memory region. Injecting data may include the redirection of the mapping (or shifting of the region). The system may utilize this injection method rather than creating a copy or copying the data. A zero-copy manner may include that throughout the lifetime of the data (e.g., once data is fetched and up until the very end of its usage/it is disposed), there are no copies of the data.

Aspects of the disclosed techniques may also include sending the data to the client in a zero-copy manner. A zero-copy manner, as described herein, may include that throughout the lifetime of the data (e.g., once data is fetched and up until the very end of its usage/it is disposed), there are no copies of the data. In some embodiments, the system may send the mapping of the data, rather than the data itself, to the client in a zero-copy manner.

Aspects of the disclosed techniques may include receiving an indication that the client performed an interaction (e.g., downloaded the data, began a session, terminated a session, modified the data, communicated with another client or target resource, etc.). In some embodiments, receiving an indication may be in response to completion of a network transaction (e.g., session, request, response, etc.) with a server, use of a secret, or closing a session.

In some embodiments, the system may need to know when to dispose of the data. For example, the system may receive an indication that the client has performed an interaction at the completion of the network transaction with the server (e.g., start a session and get an indication that a login was successful and attained a token, so the system may dispose of the secret). In some embodiments, the system may want to use a manual indicator customized to its needs (e.g., when a user only needs the secret for 10 minutes). In such an embodiment, in order to leave a degree of freedom to the user, the system may not try to find an automatic trigger and may wait for a manual trigger or indication. In yet other embodiments, the system may employ an interaction involving the data, integrations, log integrations, integrations with third party software, etc., and also check and validate credentials that were used for a procedure and not for other means.

Aspects of the disclosed techniques may include, in response to the indication, disposing of the data and the designated memory region. Disposal may include active or direct disposal, e.g., the system knows the copy is in one location, finds the location, and deletes the data, and passive or indirect disposal, e.g., the system disposes of a container and so all of the memory in the container is disposed also. Disposing of data may further include rotating pointers, changing a structure of data, moving data to a different container, moving data to different memory locations, or any other action to have data remain safe. Disposing of data may further include removing the data from the memory, taking the permissions off from the secret, deactivating it, scrambling the memory location, or taking any other action to the data that may alter or remove it. In another embodiment, the system may change the way the data is organized in the memory (shuffle the memory or change the location) such that the user may still utilize the data. In some embodiments, the disposing of the data may include no action at all. In some embodiments, the data may be kept and not disposed of.

In one embodiment, if the data or secret is 10 bytes in memory, the system may locate the location of the 10 bytes of memory and override them bit by bit with 0's or 1's to override (unmap that portion of the memory). Additionally, in some embodiments, after the system unmaps that portion of the memory, then the system may dispose of the container entirely (the memory region was inside some container). Accordingly, all the memory mapping that was in the container may now be disposed of). In some embodiments, because the data is only stored in one location, the disposing of the data is only conducted in one location also.

In one embodiment, there may be a client that does not have credentials available (either does not remember the credentials or they are not stored on the browser), and the credentials need to be accessed from a secure storage. Rather than simply creating a connection with the secure storage to get the credentials, the client may attain the secret while it remains safe through the entire pipeline via a secret provider. A secret provider may receive a request to access a credential, go into the secure storage to attain the credentials, and give the credentials to the user to login. The secret provider may be a machine, container, or instance that may be vulnerable to different attacks. Accordingly, this system that is responsible for fetching the secret from the secure storage and passing it to the user is secured with multi-layer security. Further, once the secret is fetched and until the very end of its usage (once it is disposed of), throughout this lifetime, there are no copies of the secret (zero-copy). Zero-copy may be employed from the network (from the first point that the packet arrives to an endpoint/secret provider) to the last point where it is disposed of There may be only one place that the secret is created. Once the secret is concealed in the network card/secret provider, the system may use memory mapping IO in order to take the memory portion where the secret initially is received and map it through the boundaries of the secure container (no copies, just mapping).

Aspects of this disclosure may include creating, within a protected memory region, a virtualized container and running a hardware-assisted virtualization hypervisor on the virtualized container. Further, aspects of this disclosure may include executing, on top of the hardware-assisted virtualization hypervisor, a single address space machine image with an attack surface limited according to minimal required functionality.

In some embodiments, the system provides a secure way to manage the input of data, processing of data by a user or application, and output of data (secure disposal). In one embodiment, first, a client may request a secret (e.g., password, token, hash, key, etc.). Second, the client may allocate a MAP EXCLUSIVE protected memory region. Third, within the memory region, the client may create an OS level container. The container may be dynamic (e.g., virtual machine, micro VM, container, or hypervisor, etc.). Specifically, the container may be protected with standard hardening using hardware encryption (SGX\TPM\SEV) if supported, user file permissions, ASLR SELinux, and capabilities restriction, etc. Fourth, the container may run a Hardware Assisted Virtualization hypervisor. Fifth, on top of the hypervisor, a JIT generated Unikernel may be executed, with a minimized attack surface according to minimal required functionality (e.g., may be Windows, Linux, Unikernal, etc.). Additionally, non-required components (e.g., floppy driver, unused syscalls) may be stripped from the Unikernel via a generative process. Further, the code executed by the Unikernel may be a sanitized in a read-only minimal snippet. The code may be executed in a special memory region with special handling provided by lightweight runtime (shared library). The runtime may provide an API to define a secure memory region: e.g., hardware encrypted (SGX\TPM\SEV) if supported, with the secret fetched to memory region from the network in a zero copy manner without any duplication, where the memory region may be "hidden" from the kernel using a mapping function, e.g., "mmap" in Linux, with an implementation such as "MAP EXCLUSIVE", or other inspired techniques which trick the kernel by un-mapping the pages and randomly scattering the secret across physical memory (to complicate enumeration). Sixth, the client may send the secret in zero-copy manner, parallel to the one when receiving the secret. Lastly, once the client is done with the secret (e.g., terminates a session, a time limit expires, logs out, completes a transaction, etc.), the secret may be securely disposed of along with the memory region and the container. The above steps may be implemented in varied order with other steps added and steps removed, as further discussed below.

FIG. 1 is a block diagram showing an example network and computer system 100 for providing an end-to-end secure lifecycle of data, consistent with the discussion above. FIG. 1 further demonstrates a typical secret provider use case embodiment. In such an embodiment, secrets, such as secret 120, may be stored in a highly secure storage (e.g., password-protected memory, encrypted memory, a Secure Enclave™ environment, or the like). Alternatively, secrets may be stored in random access memory (RAM), read-only memory (ROM), Flash™ memory, or other forms of unprotected memory. Further, in some embodiments, the secret provider may be implemented in a micro-service architecture masked by a load balancer and the secret provider may handle requests on a just-in-time (JIT) basis.

At step 1, as shown in FIG. 1, client 112 (or application 122) may send a login request. For example, the client 112 or application 122 may be seeking to login to a remote application, server, database, etc. At step 2, once the request is received (e.g., received or intercepted by JIT secure containers 114), the secret provider may spin up a secure container (or other virtualized instance), such as container 114, to fetch the secret and handle the request. Then the system may employ a multi-step security procedure. For example, at step 2*a*, a node may be given minimal required privileges and capabilities (e.g., based on a network\access policy). In some embodiments, this may include applying a least-privilege policy, which defines a minimal level, scope, or duration of privileges to which client 112 is entitled (or that are needed for client 112 to perform an authorized action). At step 2*b*, the container, e.g., container 114, may be vertically protected with hardening techniques. At step 2*c*, the container, e.g., container 114, may run a hardware assisted virtualization hypervisor (e.g., from Xen™, Virtual Iron™, or the like). At step 2*d*, a JIT generated Unikernel may be executed on top of the hypervisor, with a minimized attack surface according to minimal required functionality. For example, just as a least-privilege policy may be referenced in step 2*a*, in step 2*d* a least-attack surface policy may be referenced to minimize the required functionality. At steps 2*ei* and 2*eii*, the code may be executed in a special memory region with special handling provided by lightweight runtime (e.g., using a shared library). At step 4, the secret provider may handle the request by retrieving the secret from a highly secured location, e.g., secure storage 116 (e.g., protected memory, a CyberArk™ vault, etc.), and handling it in the manner described above. At step 5, once the secret or temporary token, e.g., secret 120, is ready, it may be sent back to the requesting client 112 (or application 122). The SOC Dashboard is a user-facing component of the system. In some embodiments, the SOC Dashboard may control and visualize the following: control over various security features and aggregates and digests all relevant security insights and present them to the user. Additionally, at step 3, there is an established communication between the system and the SOC such that it can perform the aforementioned tasks. Also, 124 is a mediator component which implements the required logic to enable communication between the system and the SOC Dashboard (step 3). Some of the functions may include: aggregating all events, packing events for transmission, sending events to the SOC Dashboard, and receiving and executing commands from the SOC Dashboard.

Additionally, step 2 is the process of provisioning the container upon request. Further, component 120 is a detailed (blown up) view of the process that takes in component 114. Then, step 4 is the connection between the provisioning process and the mediator component 124.

At step 5, client 112 or application 122 may receive the secret, e.g., secret 120, with an optional secured runtime and may be disposed of (e.g., deleted, disabled, replaced, rotated, deactivated, etc.) upon fulfillment of the interaction with the service (e.g., upon termination of a session, completion of a request, completion of a response, a time duration expiring, etc.). Further, one, some, none, all, or additional steps of the multi-level security layers may be employed.

FIG. 2 is a flowchart depicting an example process 200 for providing an end-to-end secure lifecycle of data, consistent with the disclosed embodiments. Process 200 may be performed by at least one processing device (e.g., by JIT secure containers), as described above. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 200. Further, process 200 is not necessarily limited to the steps shown in FIG. 2, and any steps or processes of the various embodiments described throughout the present disclosure may also be included in process 600, including those described above with respect to FIG. 1.

In step 210, process 200 may include receiving a request from a client to access data. For example, in step 210, the system may receive a request from an application to access data. Consistent with the discussion above, the data may be a file, program data, session data, a password, a token, a cryptographic key, a hash (e.g., of a password, token, or key), or other forms of data. In some embodiments, after receiving a request from the client to access the data, the system may move the data from one location to another location in a secure manner, as discussed below in steps 220-280.

In step 220, process 200 may include reserving a designated memory region (e.g., by address, group of addresses, etc.). In some embodiments, because the system is reserving a designated memory region, the system does not need to utilize the native memory of the device itself.

In step 230, process 200 may include protecting the designated memory region using access restriction to certain processes of an operating system. For example, at step 230, a packet received at a network card may be immediately received at the RAM memory and may be mapped to the virtual memory of the process (e.g., based on a memory mapped IO function). In some embodiments, the virtualized instance may be an OS level container, virtual machine, etc.

In step 240, process 200 may include receiving data from a trusted source. In some embodiments, for example, the system may receive data, such as a secret, from a trusted source such as a client. Further, in some embodiments the sensitive data (e.g., a secret) may be obtained from a credentials repository, such as a CyberArk™ vault, or the like.

In step 250, process 200 may include injecting the data into the designated memory region in a zero-copy manner. For example, at step 250, the system may receive a secret inside a network card, and it may be mapped to the physical memory. In some embodiments, the zero-copy manner may include that throughout the lifetime of the data (once data is fetched and up until the very end of its usage/it is disposed), there are no copies of the data, as discussed above.

In step 260, process 200 may include sending the data to the client in a zero-copy manner. In some embodiments, the system may send the mapping of the data, rather than the data itself, to the client in a zero-copy manner, consistent with above embodiments.

In step 270, process 200 may include receiving an indication that the client performed an interaction. In some embodiments, receiving the indication may be in response to completion of a network transaction with a server (e.g., a session, a request, a response, a time limit, etc.), use of a secret, or other triggering events.

In step 280, process 200 may include in response to the indication, disposing of the data and the designated memory region. For example, at step 280, the system may perform active (e.g., direct) or passive (e.g., indirect) disposal. In some embodiments, disposing of data may include actively removing the data from the memory, passively taking the permissions off from the secret, actively deactivating the secret, actively scrambling the memory location, passively terminating a container instance holding the secret, or taking any other action to the data that may alter or remove it. As discussed above, however, various types of techniques for disposing of the secret are possible.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A non-transitory computer readable medium including instructions that, when executed by at least one processor, cause the at least one processor to perform operations for providing an end-to-end secure lifecycle of data, comprising:
   receiving a request from a client to access data;
   reserving a designated memory region;
   protecting the designated memory region using access restriction to certain processes of an operating system;
   receiving data from a trusted source;
   injecting the data into the designated memory region in a zero-copy manner;
   sending the data to the client in a zero-copy manner;
   receiving an indication that the client performed an interaction; and
   in response to the indication, disposing of the data and the designated memory region.

2. The non-transitory computer-readable medium of claim 1, wherein protecting the designated memory region further uses at least one of:
   hardware encryption;
   file permissions restrictions;
   data randomization;
   label based descriptive limitations; or
   behavior based descriptive limitations.

3. The non-transitory computer-readable medium of claim 1, wherein the data is a secret.

4. The non-transitory computer-readable medium of claim 3, wherein the secret includes at least one of: a credential, login information, or access-restricted data.

5. The non-transitory computer-readable medium of claim 1, wherein the request is a login request.

6. The non-transitory computer-readable medium of claim 1, wherein the access restriction to certain processes of the operating system is performed using a mapping function.

7. The non-transitory computer-readable medium of claim 1, wherein the designated memory region includes a virtualized instance.

8. The non-transitory computer-readable medium of claim 1, wherein the virtualized instance is an OS level container.

9. The non-transitory computer-readable medium of claim 1, wherein protecting the designated memory region includes wrapping it in its entirety with a reduced attack surface hypervisor.

10. The non-transitory computer-readable medium of claim 1, further including
    creating, within a protected memory region, a virtualized container and
    running a hardware-assisted virtualization hypervisor on the virtualized container.

11. The non-transitory computer-readable medium of claim 10, further including
    executing, on top of the hardware-assisted virtualization hypervisor, a single address space machine image with an attack surface limited according to minimal required functionality.

12. A network system configured for providing an end-to-end secure lifecycle of data, the network system comprising:
    at least one computer-readable memory storing instructions; and
    at least one processor configured to execute the instructions to:
       receive a request from a client to access data;
       reserve a designated memory region;
       protect the designated memory region using access restriction to certain processes of an operating system;
       receive data from a trusted source;
       inject the data into the designated memory region in a zero-copy manner;
       send the data to the client in a zero-copy manner;
       receive an indication that the client performed an interaction; and
       in response to the indication, dispose of the data and the designated memory region.

13. The network system of claim 12, wherein protecting the designated memory region further uses at least one of:
    hardware encryption;
    file permissions restrictions;
    data randomization;
    label based descriptive limitations; or
    behavior based descriptive limitations.

14. The network system of claim 12, wherein the data is a secret.

15. The network system of claim 14, wherein the secret includes at least one of: a credential, login information, or access-restricted data.

16. The network system of claim 12, wherein the request is a login request.

17. The network system of claim 12, wherein the access restriction to certain processes of the operating system is performed using a mapping function.

18. The network system of claim 12, wherein the designated memory region includes a virtualized instance.

19. The network system of claim 12, wherein the virtualized instance is an OS level container.

20. A computer-implemented method for providing an end-to-end secure lifecycle of data, comprising:
    receiving a request from a client to access data;
    reserving a designated memory region;
    protecting the designated memory region using access restriction to certain processes of an operating system;
    receiving data from a trusted source;
    injecting the data into the designated memory region in a zero-copy manner;
    sending the data to the client in a zero-copy manner;
    receiving an indication that the client performed an interaction; and
    in response to the indication, disposing of the data and the designated memory.

* * * * *